United States Patent Office 2,824,804
Patented Feb. 25, 1958

2,824,804

PROCESS FOR MAKING A FERMENTED MILK, AND ITS PRODUCT

Kaiun Mishima, Tokyo, Japan

No Drawing. Application April 11, 1955
Serial No. 500,657

8 Claims. (Cl. 99—59)

This invention relates to making a fermented milk, and its product, resembling yoghurt, which contains lactic acid bacilli.

A process for making fermented milk in which whole-milk or skim-milk combined with sugar and aromatics is fermented by planting lactic acid bacteria thereon is well known. The flavor of such known product results from lactic acid fermentation and artificial aromatics.

I have conducted research for many years relating to methods of making a yoghurt-like food product including active lactobacilli, which will have a pleasant odor attributive to low alcoholic fermentation due to yeasts and the flavor of natural fruits and which will be more delicious and nutritious than ordinary yoghurt.

Accordingly, it is an object of this invention to improve the process for making a fermented milk food product including active lactobacilli which has a pleasant flavor.

It is the second object of the present invention, to produce a fermented milk product, resembling yoghurt having the flavor of natural fruits and which is more delicious and nutritious than the ordinary product.

Other objects and advantages of the invention will be apparent from the following more detailed description.

A process for making the fermented milk product in accordance with this invention is, as hereinafter described, characterized by the combination of two processes.

In the first process, whole-milk or skim-milk with about 3% of cane sugar or other sugar, or no sugar in some cases, is fermented by inoculating with yeasts and lactobacilli. The fermented milk thus obtained is mixed with another sugar and mucilage, together with natural fruit juice, fruit crushes or slices. In the second process, the mixture obtained through the first process as described above is neutralized by a counter-agent such as calcium carbonate to control the pH at 5.0–5.5. Then, whole-milk or skim-milk is again added to this mixture, and after sterilizing by heating, the mixture is cooled and the lactobacilli are inoculated to undergo lactic acid fermentation. The effect of the action in each process is as follows:

I have found that, in the case where the yeasts which undergo alcoholic fermentation by taking as their fermentative substrate the lactose in milk, or the cane sugar, or other sugar added thereto, are made to co-exist with the lactobacilli in the course of undergoing lactic acid fermentation of milk, fermentation is more satisfactory and the acid milk produced creates a finer flavor as compared with the case where the lactic acid fermentation is effected by the lactobacilli alone.

However, in the case of making yoghurt by co-existence of yeasts with lactic acid bacteria, formation of a complete curd is obstructed on account of the generation of carbonic acid gas from alcoholic fermentation, and the external aspect of the product is greatly disturbed. Besides, from the sanitary point of view, it is undesirable that living yeasts remain in a food product. Therefore, after yeasts and lactic acid bacteria have been inoculated into a portion of the milk to generate a tasteful flavor from lactic acid fermentation and raw alcoholic fermentation, and the above-mentioned additives have been added in the first process of this invention, a heat pasteurization is carried out to sterilize yeasts and lactic acid bacteria and the mixture is transformed into a kind of flavored liquid as the first step of the second process. It follows, as a next step of the second process, the adding of milk to the liquid and lactic acid bacteria for curdling.

The yeasts to be used in the first process are Saccharomyces fragilis, Sacch. cerevisiae, Sacch. ellipsoidens, Sacch. mali, Sacch. cartilaginosus and the like, however, when any lactose unfermentative yeast other than Sacch. fragilis is used it is necessary to add a small quantity of cane sugar or other sugar to the milk which acts as an alcoholic fermentative substrate.

As regards the lactobacilli to be used in the first process, Lactobacillus bulgaricus, Lactobacillus acidophilus, Streptococcus lactis, Str. thermophilus and the like are used individually or by compounding. The temperature for fermentating ranges between 30° C. and 35° C., and the time required is between 12 hours and 24 hours.

As to the fruits to be mixed with the fermented milk in the first process, such popular fruits as citrus fruits, strawberries, peaches, bananas, apples, grapes, pineapples, tomatoes etc. can be used satisfactorily according to the taste desired. The mixture of acid milk, mucilage and fruits obtained through the first process causes acidity, and the acidity causes congealment when milk is added to this mixture in the second process. Therefore, prior to the adding of new whole-milk or skim-milk in the second process, the pH of the mixture is, in the last course of the first process, controlled by neutralizing with calcium carbonate or other counter-agent so as to be kept at 5.0–5.5 which is higher than the pH of the isoelectric point of casein which is 4.6–4.7.

By the reason of the fact that casein which is the protein in the whole-milk or skim-milk used in the first process, has already curdled at the isoelectric point of casein viz. a pH of 4.6–4.7 and succeedingly has been broken to pieces by stirring-up, it is not capable of being recurdled. Therefore, whole-milk or skim-milk is added to make lactic acid fermentation again for forming a yoghurt-like curd in the second process.

As the mucilages to be used in the first process, agar, and methyl cellulose are suitable. By adding mucilages in the proportion of 0.3–0.5 percent of the whole quantity, the viscosity in the water-solution is increased after completion of the product and the surface tension of the product is so strengthened as to prevent the curd from cracking due to shocks in transportation or handling. However, there is no danger that these mucilages may coagulate in the course of manufacturing, because of their low density for use.

For the lactic acid bacterial inoculators to be used in the second process, the inoculators used in the first process as mentioned above are used individually or by compounding.

The following example shows one way of putting this invention into practice.

*First process*

10 gr. of a fermentative starter in which *Saccharomyces fragilis* and *Lactobacillus bulgaricus* have been cultivated is added to 1 kg. of skim-milk, and then the mixture is fermented at 30°–35° C. for 12–24 hours. When the titration acidity denotes 1.6 percent as lactic acid and the alcohol density reaches 0.4 percent, the end-point of fermentation is indicated. Next, 140 gr. of sugar, 4.4 gr. of methyl cellulose and 120 gr. of orange juice condensed to 1/5 of the original liquid are added to the fermented milk and mixed by stirring.

Second process

After the mixture obtained by the first process has been mixed with carbonate of lime and adjusted to a pH of 5.0–5.5, 120 gr. of skim-milk is added thereto, and then a heat-pasteurization is effected. The pasteurization is carried out by an instant heating at 75° C. Then, having been cooled rapidly, the mixture is mixed with 40 gr. of a fermentative starter in which lactobacillus bulgaricus has been cultivated and poured into small-sized containers to be fermented in a constant temperature environment of 37° C. for about 5 hours. When the titration acidity has reached 0.6–0.7 percent as lactic acid and the content has curdled like jelly, the finished product is stored in a refrigerator.

What is claimed is:

1. A process of producing a yoghurt-like doubly fermented product containing active yoghurt bacteria which comprises the steps of effecting a first fermentation of milk by inoculation with a Saccharomyces yeast effective to produce alcohol and aroma, and with a first quantity of yoghurt bacteria, adding mucilage and natural fruit products to the thus-fermented milk, adjusting the pH of the mixture to 5.0–5.5, adding a further quantity of milk, heat pasteurizing the resulting mixture and cooling it, and effecting a lactic acid second fermentation of the mixture by inoculation with a further quantity of yoghurt bacteria.

2. A process of producing a yoghurt-like doubly fermented product containing active yoghurt bacteria which comprises the steps of effecting a first fermentation of milk by inoculation with Saccharomyces fragilis to produce alcohol and aroma, and with a first quantity of yoghurt bacteria, adding mucilage and natural fruit products to the thus-fermented milk, adjusting the pH of the mixture to 5.0–5.5, adding a further quantity of milk, heat pasteurizing the resulting mixture and cooling it, and effecting a lactic acid second fermentation of the mixture by inoculation with a further quantity of yoghurt bacteria.

3. A process of producing a yoghurt-like doubly fermented product containing active yoghurt bacteria which comprises the steps of effecting a first fermentation of milk by inoculation with a Saccharomyces yeast selected from the group consisting of Saccharomyces cerevisiae, Saccharomyces ellipsoidus, Saccharomyces mali, and Saccharomyces cartilaginosus to produce alcohol and aroma and with a first quantity of yoghurt bacteria, adding mucilage, 3 to 5% of sugar, and natural fruit products to the thus-fermented milk, adjusting the pH of the mixture to 5.0–5.5, adding a further quantity of milk, heat pasteurizing the resulting mixture and cooling it, and effecting a lactic acid second fermentation of the mixture by inoculation with a further quantity of yoghurt bacteria.

4. A process of producing a yoghurt-like doubly fermented product containing active yoghurt bacteria which comprises the steps of effecting a first fermentation of milk by inoculation with a Saccharomyces yeast effective to produce alcohol and aroma, and with a first quantity of yoghurt bacteria, adding mucilage, and natural fruit products to the thus-fermented milk, adjusting the pH of the mixture to 5.0–5.5, adding a further quantity of milk, heat pasteurizing the resulting mixture and cooling it, and effecting a lactic acid second fermentation of the mixture by inoculation with a further quantity of yoghurt bacteria, said bacteria being selected from the group consisting of Bacterium bulgaricum, Bacterium acidophilum, Streptococcus lactis, Streptococcus thermophilus.

5. A process as defined in claim 1, wherein the mucilage is selected from the group consisting of methylcellulose and agar-agar.

6. A process as defined in claim 1, wherein the natural fruit products are selected from the group consisting of fruit juices, fruit crushes and fruit slices.

7. A process as defined in claim 1, wherein the pH is adjusted with calcium carbonate.

8. The product prepared by the method of claim 1.

References Cited in the file of this patent

UNITED STATES PATENTS

| | | |
|---|---|---|
| 1,710,133 | Winkler | Apr. 23, 1929 |
| 2,128,845 | Myers et al. | Aug. 30, 1938 |
| 2,719,793 | Page | Oct. 4, 1955 |